(12) United States Patent  
Khintsitskiy et al.

(10) Patent No.: US 9,378,428 B2  
(45) Date of Patent: Jun. 28, 2016

(54) INCOMPLETE PATTERNS

(71) Applicant: ABBYY Development LLC, Moscow (RU)

(72) Inventors: Ivan Petrovich Khintsitskiy, Moscow (RU); Anton Andreevich Masalovich, Moscow (RU); Andrey Anatolievich Isaev, Moscow (RU)

(73) Assignee: ABBYY Development LLC (RU)

( * ) Notice: Subject to any disclaimer, the term of this patent is extended or adjusted under 35 U.S.C. 154(b) by 0 days.

(21) Appl. No.: 14/559,024

(22) Filed: Dec. 3, 2014

(65) Prior Publication Data

US 2015/0169973 A1     Jun. 18, 2015

(30) Foreign Application Priority Data

Dec. 18, 2013  (RU) .................................. 2013156260

(51) Int. Cl.
*G06K 9/18*       (2006.01)
*G06K 9/32*       (2006.01)

(52) U.S. Cl.
CPC .......... *G06K 9/3258* (2013.01); *G06K 2209/01* (2013.01); *G06K 2209/03* (2013.01)

(58) Field of Classification Search
CPC ............ G06K 9/3258; G06K 2209/03; G06K 2209/01
USPC ........................................................ 382/182
See application file for complete search history.

(56) References Cited

U.S. PATENT DOCUMENTS

2010/0259777 A1* 10/2010 Suzuki ................. G06K 9/2063  
                                                                     358/1.11  
2015/0268834 A1*  9/2015 Buecker ........... G08G 1/096716  
                                                                     715/765

* cited by examiner

*Primary Examiner* — Ruiping Li  
(74) *Attorney, Agent, or Firm* — LeighAnn Weiland; Veronica Weinstein

(57) ABSTRACT

A method for recognizing characters in an image includes receiving the image containing characters to be recognized and analyzing the received image. A first portion of the received image is compared to a set of patterns to determine a first coincidence value for each pattern in the set of patterns and a first series of hypotheses is generated based at least on the determined first coincidence values. A second portion of the received image is compared to a set of selected patterns to determine a second coincidence value for each pattern in the set of selected patterns, where the set of selected patterns is selected based at least on the generated first series of hypotheses. Recognition of the characters is based on the first and second series of hypotheses, and an identified sequence of characters.

27 Claims, 6 Drawing Sheets

INCOMPLETE PATTERNS

CROSS REFERENCE TO RELATED APPLICATIONS

This application claims the benefit of priority to Russian patent application No. 2013156260, filed Dec. 18, 2013; disclosure of which is incorporated herein by reference.

FIELD OF TECHNOLOGY

This disclosure relates to a device, system, method, and computer software in the field of processing of images, documents, and texts using Optical Character Recognition.

BACKGROUND

Optical character recognition (OCR) systems are used to transform images or representations of paper documents, for example document files in the Portable Document Format (PDF), into computer-readable and computer-editable and searchable electronic files. A typical OCR system includes an imaging device that produces the image of a document and software that runs on a computer that processes the images. As a rule, this software includes an OCR program, which can recognize symbols, letters, characters, digits, and other units and save them into a computer-editable format—an encoded format.

SUMMARY

In one aspect, the present disclosure is related to a method for characters recognition in an image. The method includes receiving, by a computing device, the image containing characters to be recognized and analyzing the received image to detect a region of interest of the received image. The method further includes comparing, relative to the detected region of interest, a first portion of the received image to a set of patterns to determine a first coincidence value for each pattern in the set of patterns and generating a first series of hypotheses based at least on the determined first coincidence values. The method further includes comparing a second portion of the received image to a set of selected patterns to determine a coincidence value for each pattern in the second set of selected patterns, where the second set of selected patterns is selected based at least on the coincidence value, the generated first series of hypotheses and knowledge about the sequence of characters, and generating a second series of hypotheses of recognition. In some implementations, the method includes converting the received image to a binarized image and cropping and/or re-sizing the received image according to a boundary value of pixels of character in the received image. The method further includes calculating hypothesis values for each hypothesis in the generated first series of hypotheses and the generated second series of hypotheses, and assigning a confidence rating to each hypothesis in the generated first series of hypotheses and the generated second series of hypotheses, where the confidence ratings are based at least on the respective determined coincidence values. The method further includes ranking the generated first series of hypotheses based on confidence rating and ranking the generated second series of hypotheses based on an identified sequence of characters. In some implementations, the set of selected patterns is selected based on the ranking of each hypothesis in the generated first series of hypotheses In another aspect, the present disclosure is related to a system to recognize characters in an image. The system includes an image capturing device configured to receive the image, a memory configured to store processor-executable instructions, and a processor operatively coupled to the memory. In some implementations, the processor is configured to analyze the received image to detect a region of interest of the received image and compare, relative to the detected region of interest, a first portion of the received image to a set of patterns to determine a first coincidence value for each pattern in the set of patterns. The processor is further configured to generate a first series of hypotheses. The processor is further configured to compare a second portion of the received image to a selected patterns to determine a coincidence value for each pattern in the second set of selected patterns, where the second set of selected patterns is selected based at least on the generated first series of hypotheses, and generate a second series of hypotheses of recognition.

In some implementations, the image capturing device is communicatively coupled to the processor. In some implementations, the processor is configured to convert the received image to a binary image. The processor is further configured to crop the received image according to a boundary value of pixels of characters in the received image. The processor is further configured to calculate hypothesis values for each hypothesis in the generated first series of hypotheses and the generated second series of hypotheses. The processor is further configured to assign a confidence rating to each hypothesis in the generated first series of hypotheses and the generated second series of hypotheses, where the confidence ratings are based at least on the respective determined coincidence values. The processor is further configured to rank the generated first series of hypotheses based on confidence rating and ranking the generated second series of hypotheses based on an identified sequence of characters.

In another aspect, the present disclosure is related to a computer-readable storage medium having computer-readable instructions stored therein, the instructions being executable by a processor of a computing system. The instructions include instructions to receive the image containing characters to be recognized and instructions to analyze the received image to detect a region of interest of the received image. The instructions further include instructions to compare, relative to the detected region of interest, a first portion of the received image to a set of patterns to determine a first coincidence value for each pattern in the set of patterns and instructions to generate a first series of hypotheses based at least on the determined first coincidence values. The instructions further include instructions to compare a second portion of the received image to a set of selected patterns to determine a coincidence value for each pattern in the second set of selected patterns, where the second set of selected patterns is selected based at least on the generated first series of hypotheses, and instructions to generate a second series of hypotheses of recognition. In some implementations, the instructions include instructions to calculate hypothesis values for each hypothesis in the generated first series of hypotheses and the generated second series of hypotheses. In some implementations, the instructions include instructions to assign a confidence rating to each hypothesis in the generated first series of hypotheses and the generated second series of hypotheses, where the confidence ratings are based at least on the respective determined coincidence values. The instructions further include instructions to rank the generated first series of hypotheses based on confidence rating and ranking the generated second series of hypotheses based on an identified sequence of characters.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one implementation" or "an implementation" means that a particular feature, structure, or characteristic described in connection with the implementation is included in at least one implementation of the invention. The appearances of the phrase "in one implementation" in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not other implementations.

One of the current issues in Optical Character Recognition (OCR) that arises is the recognition of characters in an image (or viewfinder frame) that are reflected, displayed and/or represented incompletely for some reason, e.g., the image only contains a portion of the character. For example, this situation occurs most frequently when recognizing images (frames) from reading a drum-type instrument. One example of an instrument of this type is the electric meter. As such, the need arises to recognize portions of characters, or in other words, "broken characters".

The present disclosure is generally related to methods and systems that include commands for a device, an operating system, a firmware, and a software that address the issue of optically recognizing characters on an image (or in a frame) that are displayed incompletely; in other words, the image only contains a portion of a character or portions of multiple characters. In view of this, this problem cannot be handled using the standard recognition method, since this would lead to a large number of incorrectly recognized characters. We propose using the method and device described below.

Figure 1:
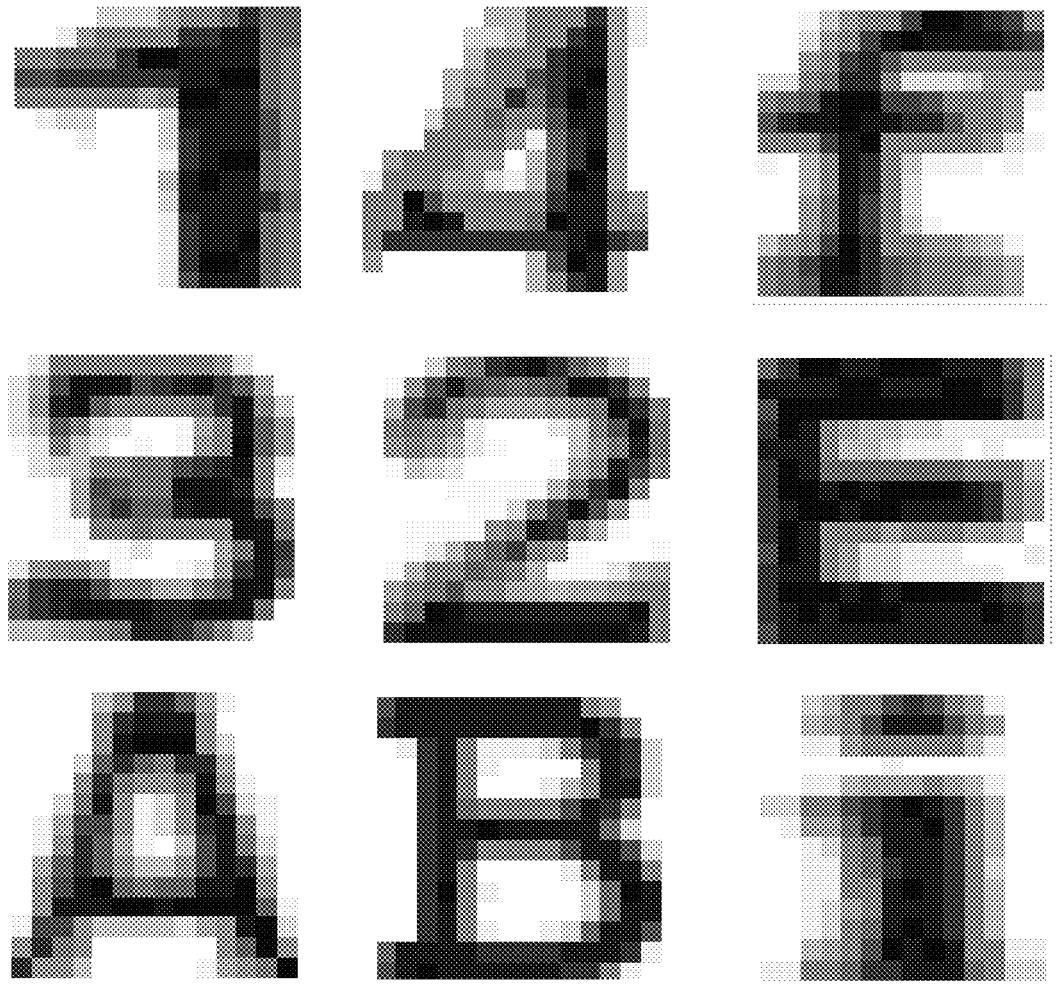
FIG. 1 is an illustration of example patterns in accordance with an example implementation.

One of the methods of implementation for the partial character recognition method may include use of a raster classifier. The raster classifier operating principle is based on direct comparison of a character image (i.e. grapheme) against a pattern. In this regard, the pattern may contain any characters including letters, digits, hieroglyphs, etc. In addition to the raster classification method, other known classification methods may be implemented into the methods and systems described herein. Example patterns for various characters that may be recognized using the methods and systems are illustrated in FIG. 1. The various characters represented in FIG. 1 are only examples of the type of patterns that may be used to recognize characters in a received image.

A variety of pattern types may be applied for recognition of characters shown incompletely in an image. In one implementation, a standard set of patterns that supports operation of an optical character recognition system can be used for recognition of characters shown fully in an image. This set of patterns includes patterns for "intact" characters (letters, digits, etc.). Use of a standard set of patterns makes problematic recognition more efficient, since it is not necessary to create patterns during the classifier training phase (stage), and this significantly reduces the execution time for the algorithm.

The patterns of characters may be obtained via a known method. In the basic implementation, previously created character patterns may be used. However, in the absence of such a set of patterns, such patterns can be obtained during the classifier training phase. For example, in one implementation, a set of images for the type of character in question may be obtained during the classifier training phase. The resulting images are compressed and transformed into a standard form, for example and without limitation an image with dimensions of 14×14 pixels. After the images are compressed, image averaging is used to create a pattern for the character (digit, letter, etc.) from the initial image set via image averaging. This procedure is performed for each character, forming patterns of characters that can then be used for recognition.

Figure 2:
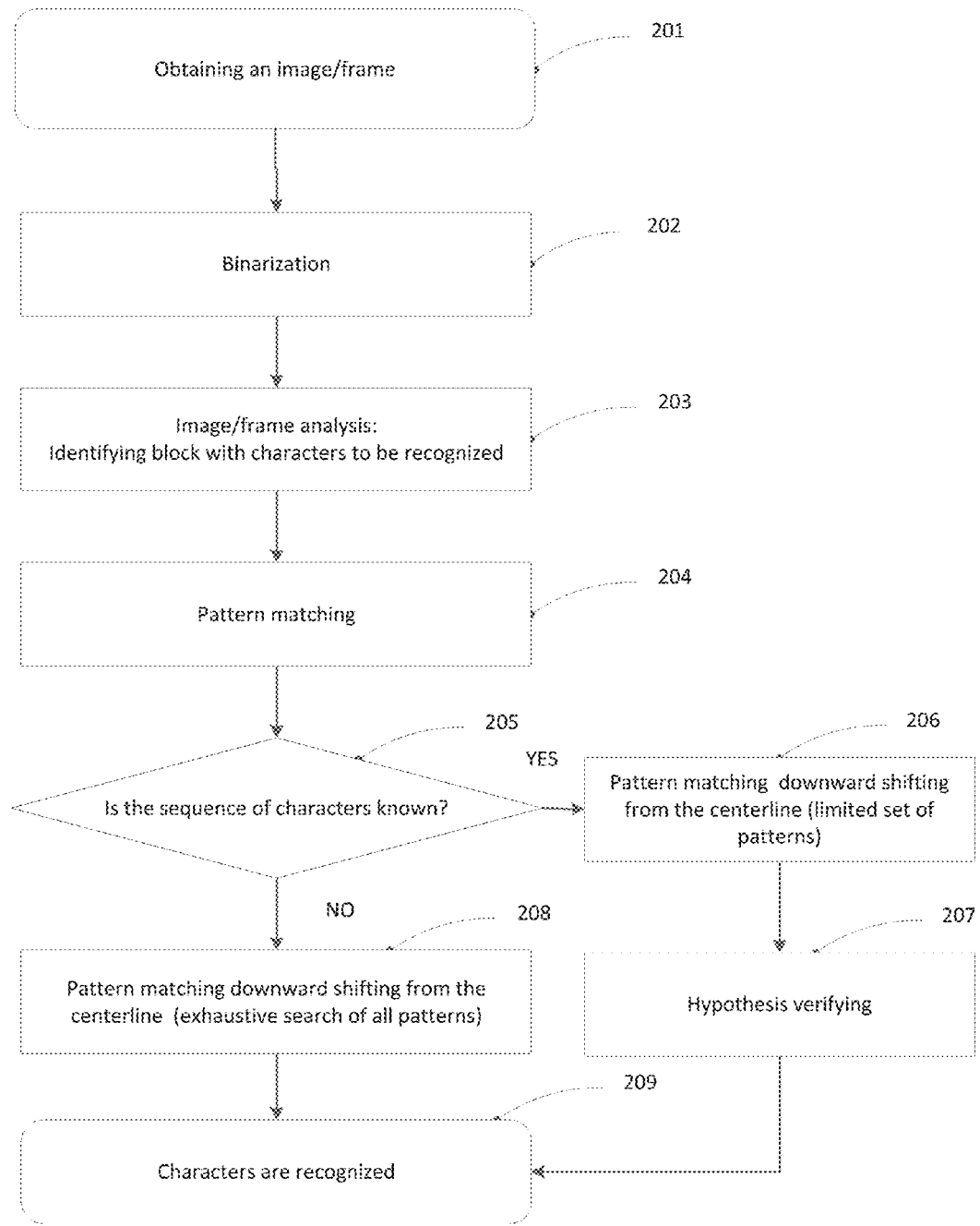
FIG. 2 is a flow diagram of a method implementation for recognizing portions of characters in a received image.
Figures 3A, 3B, 3C:
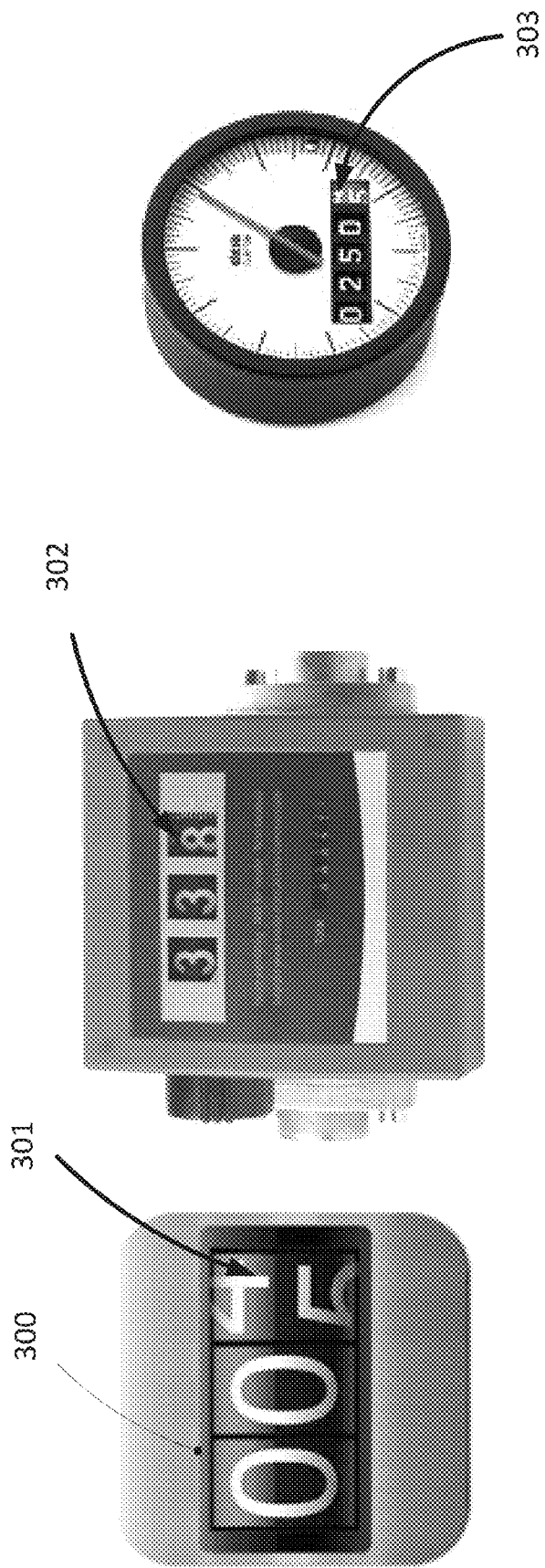
FIGS. 3A-3C illustrate several examples of drum-type instruments in accordance with an example implementation.

FIG. 2 shows a flow diagram of a method for identifying characters in an image. The method may be implemented on a computing device (e.g., a user device). In one implementation, the method is encoded on a computer readable medium that contains instructions that, when executed by the computing device, cause the computing device to perform operations of the method. The incomplete characters recognized by the method described herein can be characters shown incompletely in an image (or frame), for example on an image with a digital drum-type display. Such displays are frequently used in a wide variety of mechanical devices, which feature a rotating drum with digits and a window in which the digits are displayed as they roll by. Meters (e.g., electric meters) are an example of the type of instrument, as illustrated in FIGS. 3A-3C. Because the drum bearing the numbers is continually moving while reading the variable of interest (e.g., electric power consumption), the digits on the drum also will continuously, and may only be partially displayed in the window, as illustrated in FIGS. 3A-3C.

FIG. 3 illustrates several examples of drum-type instruments in accordance with an example implementation. In more detail, as illustrated in FIG. 3A, a portion of the digit "4" and a portion of the digit "5" are shown in the window 300. A user would have no difficulty determining which digits are shown in the instrument readout window. However, from the point of view of automated optical character recognition processing of images (or frames) containing numerical (or alphabetic) instrument readings, this problem is difficult, since the digits on the image are incomplete, and the image only shows fragments of digits. On the other hand, the problem of recognition of complete digits in an image, for example as illustrated in FIG. 3B, the digit "8." (302) is not difficult, and can be performed using one of the known methods for Optical Character Recognition (OCR). A frame may be referred to as an image herein, and an image may be referred to as a frame herein.

Referring back to FIG. 2, the method includes receiving an image containing characters to be recognized. At block 201, an image (or frame) containing the characters to be recognized is obtained. This image (or frame) may be obtained electronically using one of the known methods. In some implementations, an image capturing device can transmit the image via a wireless connection to an electronic device, for example and without limitation, the electronic device described in FIG. 6. In other implementations, the image capturing device is built into an electronic device, for example and without limitation, the electronic device described in described in FIG. 6. In some implementations, the image capturing device is a camera built into the electronic device and may be used to obtain an image or video containing the object of interest. In the present disclosure, the object of interest is text-based or any other character-based data. In some implementations, the image may be obtained from the memory of an electronic device, or from any other accessible sources.

In some implementations, analysis of an image (frame) may be performed in real time. That is, this disclosure can be used for analysis of viewfinder frame output, for example, to the screen of an electronic device. Here, the display of the image on the viewfinder frame on the device screen may occur without (preliminary) recording of the video or photo image. The analysis is performed by following successive frames, and then recognizing selected individual frames from the video stream.

Still referring to FIG. 2, at block 202, the received image is binarized relative to some selected suboptimal threshold value. Inverted threshold binarization may be used for conversion of the frame being analyzed into a binarized image. This is done by establishing some suboptimal threshold binarization value th. In some implementations, to establish a suboptimal threshold binarization value th, Otsu's algorithm and method may be performed. In other implementations, to establish suboptimal threshold binarization value th, see for example the methods disclosed in U.S. patent application Ser. No. 12/269,789, "Method and System for Binarizing an Image" and U.S. patent application Ser. No. 13/328,239, "Binarizing an Image," which are both incorporated herein by reference in their entirety. Pixels with values greater than or equal to th are assigned a value of 1, while pixels with values less than th are assigned a value of 0. The received image is binarized, i.e., each pixel in the frame has one of two values (0 or 1). Other binarization techniques may also be used. The scene in the viewfinder and the imaging conditions from frame to frame are assumed to vary insignificantly, which enables the suboptimal binarization parameter for the current series of frames to be selected on the basis of previously analyzed frames.

Figure 4:
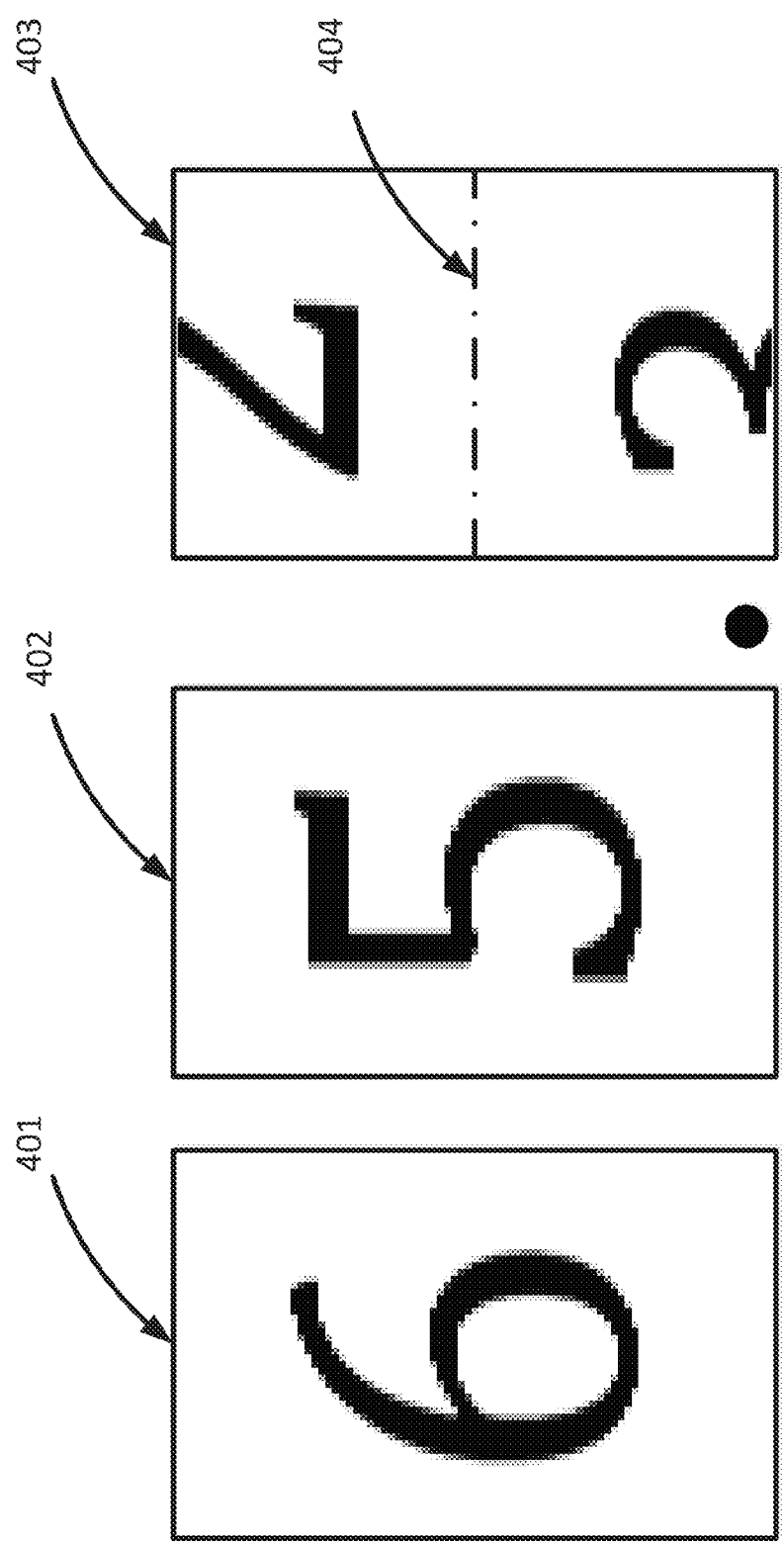
FIG. 4 is an example of an image to be analyzed, with the digits only being partially visible.

At block 203, the resultant image or frame is analyzed, in some implementations, as part of the Document Analysis task. During this step, the region or block of direct interest for the character recognition task is identified within the resulting binarized image. This region may be identified using one of the known methods for analysis of natural scenes. For example, if this block contains digits from a drum type display displayed in a window (as shown in FIG. 3A (300) and in FIG. 4 (401-403)), it may be identified on the basis of various color designs and/or previously specified attributes. FIG. 4 is an example of an image to be analyzed, with the digits only being partially visible. After the block containing the digits (characters) to be recognized has been identified in the binarized image (or frame), the center of this block, or in other words, the central line of pixels (as indicated by the dashed line (404) in FIG. 4) is determined. This dashed line may be used for matching of the pattern on the image, as described later.

Figure 5:
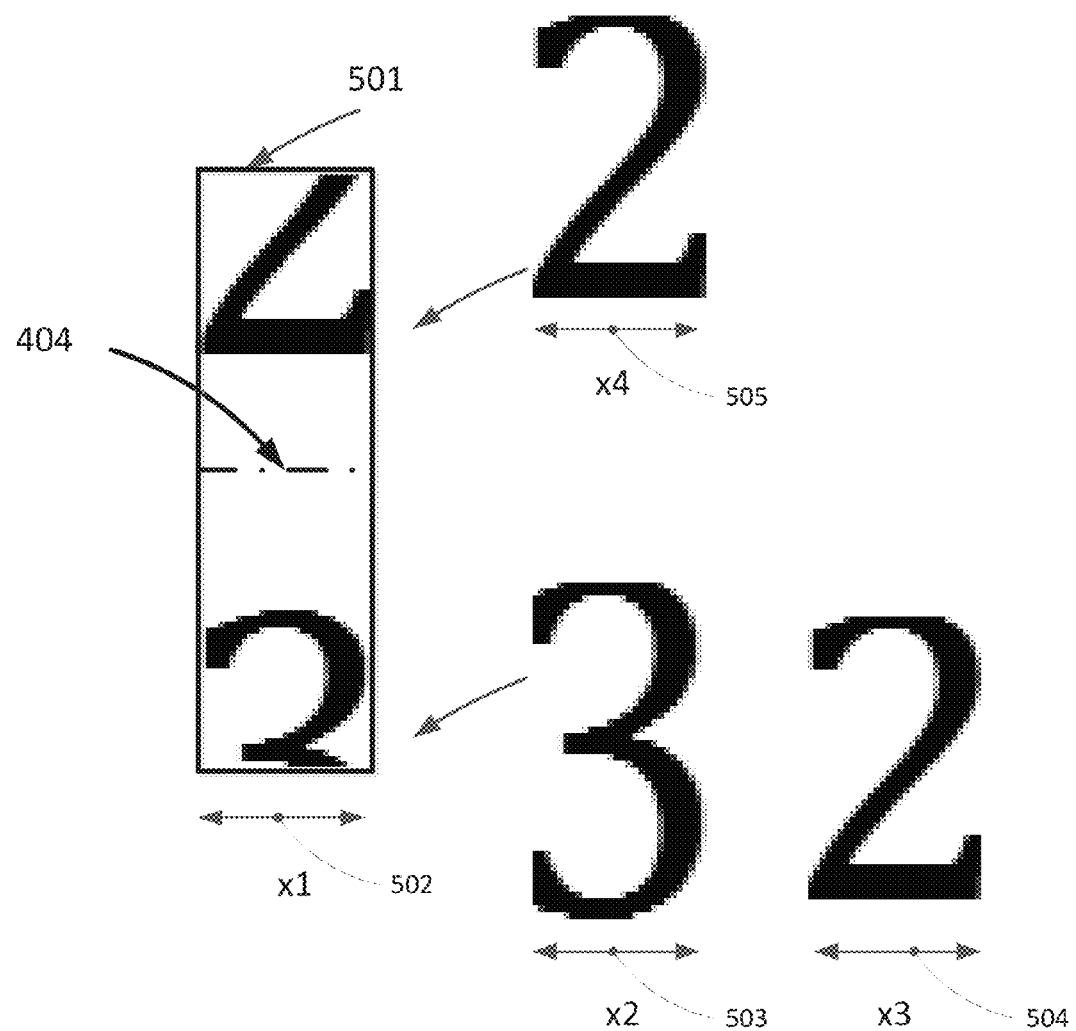
FIG. 5 illustrates an example of the matching of patterns on a received image in accordance with an example implementation.

The method further may include cropping the received image. The image (frame) in the identified window (block) may be cropped to the boundaries of the black pixels (or white pixels, depending on the binarization parameters) of the characters, in such a way that the cropped image contains a single row of characters arranged, for example, above one another, as illustrated in FIG. 5 (501). FIG. 5 illustrates an example of the matching of patterns on a received image in accordance with an example implementation. The cropped image, as illustrated in FIG. 5 (501), is compressed (reduced) in such a way that the image parameters (e.g., width, etc.) are identical to the parameters (e.g., width, etc.) of the matched patterns. For example, FIG. 5 shows the width parameters (502), (503), (504), (505) are identical: $x_1 = x_2 = x_3 = x_4$.

In some implementations, at block 204, the pattern is matched relative to the center of the block. The pattern may be matched to compare a first pattern to the received image, for example and without limitation, by matching the first pattern over the received image. A mark in the form of an arrow or line (which may be present in the image) may be used as a center; this mark may be detected during step (203). However, the aforementioned mark may be absent from the image. In this case, the pattern may be matched relative to the central line, as illustrated in FIG. 4 (404).

At block 205, a comparison of a first portion of the received image to a first pattern relative to the detected region of interest is performed to determine a coincidence value. In some implementations, the first portion of the received image can be the top half of the characters in the received image. The top half may be the character portions above a centerline of the region of interest of the received image. In other implementations, the first portion of the received image may be the bottom half of the characters in the received image. The bottom half may be the characters below the centerline. Matching by convolution of various patterns on the image provides a calculation of the precision with which the patterns coincide with the pixel image. In this case, the pattern is matched on the image by shifting the pattern up and down relative to the center of the image (404) until maximum coincidence (i.e., matching) between the image and pattern is achieved. In some implementations, areas of possible shifts of the matched patterns are specified and a confidence value for each of the possible shifts is determined. The maximum coincidence value may be selected based on the highest confidence level for each of the possible shifts. Simultaneously, the hypothesis $H_i$ that a given pattern i is completely identical to the character being recognized is proposed. During this process, each hypothesis is assigned a specific weight $W_1$, or in other words, a quantity reflecting the precision with which the image coincides with the i-th pattern. As used herein, the weight value can be referred to as a confidence rating. To some extent, the confidence rating describes the confidence level of the recognition. The higher the confidence rating (i.e., weight value), the higher the percentage of coincidence between image and pattern.

In some implementations, the value of the weight is calculated based on an analysis of the intersection between the pattern and image of character (grapheme), or the horizontal strip containing the region of intersection. The standard method for recognition of "intact" characters involves the calculation of penalties if parts of the character (letter/digit) extend beyond the area where the pattern and image intersect.

In the present disclosure, these penalties may not be calculated, since the pattern is only matched over a portion of the character letter, digit, etc. In the present disclosure, there will exist some parts of the image or pattern that may extend beyond the area where the pattern coincides with the image of the partial digit.

Thus, during the procedure formatched of the pattern on the image, a series of hypotheses $H_1, \ldots, H_i, \ldots, H_n$ is generated. In some implementations, this list of hypotheses is ranked, for example and without limitation, by increasing value based on the corresponding weight values $W_1, \ldots, W_i, \ldots, W_n$. That is, the top of the hypothesis list is occupied by the hypotheses with the highest recognition confidence and/or confidence rating, i.e., the hypotheses with the highest weight.

At block 206, a comparison of a second portion of the received image to a second pattern is performed. The second pattern may be selected based at least upon the generated series of hypotheses. In some implementations, the second portion of the received image may be the bottom half of the characters in the received image. The bottom half may be the characters below the centerline of the region of interest of the received image. In other implementations, the second portion of the received image can be the top half of the characters in the received image. The top half may be the character portions above the centerline. Once the top half of the character (digit) image has been analyzed, the patterns are matched over the lower half of the image, or, in other words, below the center of the region of interest. During this step, the patterns are matched on the basis of information regarding the nature of the sequence in the drum-type sensor.

That is, according to one example implementation presented here, the primary trait is that the digits or characters on the drum type sensor are portrayed in a certain sequence. This sequence may be linear, e.g., the digits may be in increasing order "0," "1," "2," "3," . . . "9", or letters may be in alphabetical order, for example, in Russian (Cyrillic), <<А>>, <Б>> . . . <<Я>>; in English (Roman), "A," "B," . . . , "Z," etc. However, this implementation does not place any restrictions on the type of sequence; i.e., the sequentiality can be of any type. At the same time, the rule governing the arrangement of characters in the sequence may be known in advance, as in the case of electric meters, or this rule may be detected during initial training of the classifier.

In some implementations, knowledge of the type of the sequence of characters may be used, at block 206, in order to rank the patterns pairs used for recognition. Ranking the patterns helps substantially reduce the time to perform the search algorithm to identify the "paired" pattern for a character. In the present disclosure, a "paired" pattern can refer to patterns that follow one another in accordance with the character sequence. For example, the patterns for the digits "1" and "2," "2" and "3," and "3" and "4" are "paired" patterns in the sequence "0," "1," "2," "3" . . . "9."

The character sequence identified during the training process can be used to formulate a corresponding set of patterns arranged in pairs. In some implementations, the corresponding set of patterns may be used to select the second pattern used for comparison at block 206. Thus, for example, if it is determined that the characters on the instrument are arranged in increasing order "0," "1," "2," "3" . . . "9," then the set of patterns can be successive pairs of patterns, and, specifically, the set may include the following ordered pairs of patterns of the type: "0"-"1," "1"-"2," "2"-"3," "3"-"4," "4"-"5," "5"-"6," "6"-"7," "7"-"8," "8"-"9," "9"-"0." Or, if it is found that the characters on the instrument are in alphabetical order "A,"
"B," . . . , "Z," then the set may include the following ordered pairs of patterns of the form: "A"-"B," "B"-"C," "C"-"D," . . . , "W"-"Z," "Z"-"A," etc.

Returning to FIG. 2, after the pattern corresponding to the top portion of the image (or the top character in the image) has been found, and the character sequence is known, it will then be known which character pattern should be selected for the bottom portion of the image. However, since matching of the pattern for the top portion of the image results in some list of hypotheses for image correspondence to a specific set of patterns $H_1, \ldots, H_i, \ldots, H_n$ ordered with respect to the weights, $W_1, \ldots, W_i, \ldots, W_n$, the input for further recognition of the bottom character in the image using, for example, the raster classifier will therefore be some restricted set of pattern $H'_1, \ldots, H'_m$.

For example, recognition of the top portion of the image (or the top character) may be the basis to generate the hypothesis $H_2$ that the pattern for the digit "2" coincided with the image, with the hypothesis $H_2$ having a certain weight value $W_2$. Then, at the input to step (206)—recognition of the bottom portion of the image (or the bottom character)—the pattern for the digit "3" will initially be verified. That is, the hypothesis $H'_3$ is formulated that the pattern for the digit "3" coincides with the image with a certain weight value $W'_3$.

At block 207, all of the hypotheses can be verified. Matching of the pattern over the bottom portion of the image is, in a way, a test of the hypotheses $H_1, \ldots, H_i, \ldots, H_n$. Hypotheses can be confirmed or rejected on the basis of the character recognition results for the bottom portion of the image. Returning to the example under discussion, if the hypothesis $H'_3$ for the pattern of the digit "3" has the highest weight value $W'_3$, the hypothesis $H_2$ is confirmed.

At block 209, in some implementations, if the hypotheses has been confirmed, the characters and/or symbols in the received image can be recognized. If the hypothesis for the selected patterns has the highest weight value, the hypothesis, in some implementations, is correct and the characters and/or symbols of the selected patterns can be the characters and/or symbols of the received image.

At block 208, if the character sequence is unknown, recognition becomes more complex. In some implementations, the method may include an exhaustive search and test of all patterns until a match is detected. The exhaustive search can include comparing the received image to the patterns from the entire set, such that the patterns from the entire set of patterns are matched on the received image. This process may continue until a maximum coincidence value is achieved, similar to the process described in block 205.

The total weight value for the pair of patterns for the top and bottom portions of the image may be calculated as the sum of the corresponding weight values, e.g., as follows $W_2+W'_3$ for the example discussed above.

The recognition algorithm for incomplete characters operates in a similar manner to the recognition described in block 204. In some implementations, the recognition algorithm for incomplete characters begins with the bottom portion of the image (or the bottom character). Correspondingly, recognition of the top portion of the image (or the top character) can be performed, as described in blocks 206 and 208, respectively. Thus, if matching of the patterns begins below the center of the image (404), then after the appropriate pattern has been found for the bottom portion of the image (or the bottom character), it is known which character pattern should be selected for the top portion of the image.

A set of patterns for portions of characters may also be used in addition to the standard set of patterns. However, the set of pattern for a single character will be significantly larger than the standard set of patterns for "intact" characters. This will increase the probability of erroneous recognition.

In some implementations, patterns containing a pair of characters may be used for recognition. These patterns are characterized by the fact that they contain characters that follow one another, i.e., that are located under one another. For example and without limitation, a pattern may include two characters at the same time, e.g., "5-6," "6-7," "7-8," etc. These patterns contain patterns of "intact" characters, that is, they are not "broken." These patterns are generated in such a way that the distance between the digits on the mechanical device's drum is known, such as in the case of an electric meter drum. The distance between digits is generally fixed. If this distance is not standardized, then other patterns which may be corrected can be used.

In some implementations, to recognize the characters portrayed incompletely and fragmentarily in an image involves increasing the precision of instrument readout. In such implementations, it is then possible to calculate the values for the least significant digits of the numerical readings not shown in the instrument window. For example and without limitation, it is possible to determine that the reading on the meter display (or any other drum type instrument) is not just values of 65 or 66 (FIG. 4) but has, for example, values accurate to two or more digits after the decimal point. It may be possible to determine that the meter reading corresponds to a value of 65.5. That is, knowing that the digits roll by in increasing order, it is possible to extract additional information by determining what percentage of the number is visible. In this way, it is possible to increase the accuracy of calculated data.

In some implementations, when recognizing the fragments of characters (digits) displayed in the instrument window, the distance from the center of the display (404) in the readout window (of the mechanical drum) to the center of the digit can be calculated. The recognition results can be used to calculate the distance $h_1$ from the center of the window (404) to the center of the top recognized digit. Likewise, the distance $h_2$ from the center of the window (44) to the center of the bottom recognized digit is calculated. The ratio of these distances $$\frac{h_1}{h_2}$$

is then calculated. The resulting ratio is the numerical value of the decimal place not displayed or incompletely displayed in the image.

Various electronic devices with viewfinders can be used to read the data from the instrument. A mobile device with an imaging capture device component, for example and without limitation, a camera may be used as such a device. In this case, reading occurs at regular intervals; for example, this is important for safety controls. This also enables automating the external monitoring of instruments with appropriate displays, such as the on-board equipment in an aircraft. Consequently, safety levels are raised.

Figure 6:
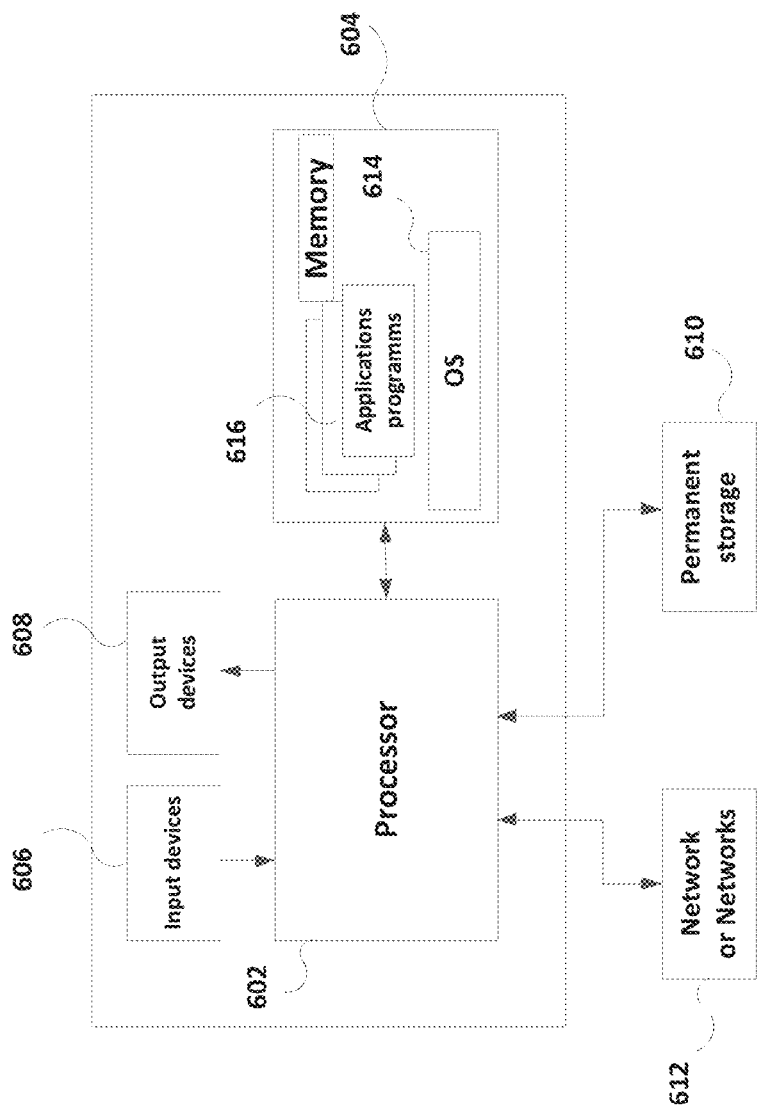
FIG. 6 illustrates an example electronic device that can be used to process received images in accordance with an example implementation.

FIG. 6 illustrates an example electronic device that can be used to process received images, in accordance with an example implementation. In more detail, FIG. 6 illustrates an example of a computer platform (600) that may be part of an electronic device used to implement the methods accomplished as described above. In one implementation, the computer platform 600 is encoded on a computer-readable medium that contains instructions that, when executed by the computing device, cause an electronic device to perform operations described in FIG. 2. The computer platform (600) includes at least one processor (602) connected to a memory (604). The processor (602) may be one or more processors, may contain one, two, or more computer cores, or may be a chip or other device capable of doing computation (for example, a Laplace transform may be performed optically). The memory (604) may be a random-access memory (RAM) and may also contain any other types or kinds of memory, particularly non-volatile memory devices (such as flash drives) or permanent storage devices such as hard drives, etc. In addition, an arrangement can be considered in which memory (604) includes information-storage media built into equipment physically located elsewhere on the computer platform (600), such as a memory cache in the processor (602) used as virtual memory and stored on an external or internal permanent storage device (610).

The computer platform (600) can have a certain number of input and output ports to transfer information out and receive information. For example and without limitation, for interaction with a user, the computer platform (600) may include one or more input devices (such as a keyboard, a mouse, a scanner, etc.) and a display device (608) (such as a liquid crystal display or special indicators). The computer platform (600) may also have one or more read only memory devices (610) such as an optical disk drive (CD, DVD or other), a hard disk, or a tape drive. In addition, the computer platform (600) may have an interface with one or more networks (612) that provide connections with other networks and computer equipment. In particular, this may be a local area network (LAN) and/or a wireless Wi-Fi network, which may or may not be connected to the World Wide Web (Internet). It is understood that the computer platform (600) includes appropriate analog and/or digital interfaces between the processor (602) and each of the components (604, 606, 608, 610 and 612).

In some implementations, the computer platform (600) is managed by the operating system (614) and includes various peripherals, components, programs, objects, modules, etc. designated by the consolidated number 616.

The programs used to accomplish the methods corresponding to this disclosure may be a part of an operating system or may be a specialized application, component, program, dynamic library, module, script or a combination thereof.

This description shows the basic inventive concept of the inventors, which cannot be limited by the hardware mentioned earlier. It should be noted that hardware is primarily intended to solve a narrow problem. As time goes by and as technology develops, this type of task becomes more complex or evolves. New tools arise that are capable of meeting new demands. In this sense, it is appropriate to look at this hardware from the point of view of the class of technical tasks it can solve, not simply a technical implementation on some set of hardware components.

What is claimed is:

1. A method for identifying characters in an image, the method comprising:
    receiving, by a computing device, the image containing characters to be recognized;
    analyzing the received image to detect a region of interest of the received image;
    comparing, relative to the detected region of interest, a first portion of the received image to a set of patterns to determine a first coincidence value for each pattern in the set of patterns;
    generating a first series of hypotheses based at least on the determined first coincidence values;
    comparing a second portion of the received image to a set of selected patterns to determine a second coincidence value for each pattern in the set of selected patterns, wherein the set of selected patterns is selected based at least on the generated first series of hypotheses;

generating a second series of hypotheses based at least on the determined second coincidence values; and recognizing the characters in the received image based at least on the first series of hypotheses and the second series of hypotheses.

2. The method of claim 1, wherein analyzing the received image further comprises converting the received image to a binarized image.

3. The method of claim 1, wherein analyzing the received image further comprises cropping at least the region of interest of the received image according to a boundary value of pixels of characters in the received image.

4. The method of claim 1, wherein analyzing the received image further comprises detecting a centerline of the region of interest, wherein an area of the region of interest above the centerline is referred to as the first portion of the received image, and wherein an area of the region of interest below the centerline is referred to as the second portion of the received image.

5. The method of claim 1, wherein comparing the first portion of the received image further comprises calculating hypothesis values for each hypothesis of recognition in the generated first series of hypotheses based at least on the determined first coincidence values of a grapheme with a pattern.

6. The method of claim 5, further comprising ranking the generated first series of hypotheses based on a confidence rating.

7. The method of claim 1, wherein comparing the second portion of the received image further comprises calculating hypothesis values for each hypothesis of recognition in the generated second series of hypotheses based at least on the determined second coincidence values of a grapheme with a pattern.

8. The method of claim 7, further comprising ranking the generated second series of hypotheses based on a confidence rating.

9. The method of claim 5, further comprising selecting a set of patterns for the second portion of the received image based on the generated first series of hypotheses.

10. The method of claim 5, further comprising selecting a set of patterns for the second portion of the received image based on knowledge about the sequence of characters.

11. A system to identify characters in an image, the system comprising:
an image capturing device configured to receive the image;
a memory configured to store processor-executable instructions; and
a processor operatively coupled to the memory, wherein the processor is configured to:
analyze the received image to detect a region of interest of the received image;
compare, relative to the detected region of interest, a first portion of the received image to a set of patterns to determine a first coincidence value for each pattern in the set of patterns;
generate a first series of hypotheses based at least on the determined first coincidence values;
compare a second portion of the received image to a set of selected patterns to determine a second coincidence value for each pattern in the set of selected patterns, wherein the set of selected patterns is selected based at least on the generated first series of hypotheses;
generate a second series of hypotheses based at least on the determined second coincidence values; and
recognize the characters in the received image based at least on the first series of hypotheses and the second series of hypotheses.

12. The system of claim 11, wherein the image capturing device is communicatively coupled to the processor.

13. The system of claim 11, wherein the processor is configured to convert the received image to a binarized image.

14. The system of claim 11, wherein the processor is configured to crop at least the region of interest of the received image according to a boundary value of pixels of characters in the received image.

15. The system of claim 11, wherein the processor is configured to detect an area of the region of interest above a centerline, referred to as the first portion of the received image, and to detect an area of the region of interest below the centerline, referred to as the second portion of the received image.

16. The system of claim 11, wherein the processor is configured to calculate hypothesis values for each hypothesis of recognition in the generated first series of hypotheses based at least on the determined first coincidence values of a grapheme with a pattern.

17. The system of claim 16, wherein the processor is configured to rank the generated first series of hypotheses based on a confidence rating.

18. The system of claim 11, wherein the processor is configured to calculate hypothesis values for each hypothesis of recognition in the generated second series of hypotheses based at least on the determined second coincidence values of a grapheme with a pattern.

19. The system of claim 11, wherein the processor is configured to select a set of patterns for the second portion of the received image based on the generated first series of hypotheses.

20. The system of claim 11, wherein the processor is configured to select a set of patterns for the second portion of the received image based on a knowledge about the sequence of characters.

21. A non-transitory computer-readable storage medium having computer-readable instructions stored therein, the instructions being executable by a processor of a computing system, wherein the instructions comprise:
instructions to receive the image containing characters to be recognized;
instructions to analyze the received image to detect a region of interest of the received image;
instructions to compare, relative to the detected region of interest, a first portion of the received image to a set of patterns to determine a first coincidence value for each pattern in the set of patterns;
instructions to generate a first series of hypotheses based at least on the determined coincidence values;
instructions to compare a second portion of the received image to a set of selected patterns to determine a second coincidence value for each pattern in the set of selected patterns, wherein the set of selected patterns is selected based at least on the generated first series of hypotheses;
instructions to generate a second series of hypotheses based at least on the determined second coincidence values; and
instructions to recognize the characters in the received image based at least on the first series of hypotheses and the second series of hypotheses.

22. The non-transitory computer-readable medium of claim 21, further comprising instructions to detect an area of the region of interest above a centerline, referred to as the first portion of the received image, and to detect an area of the region of interest below the centerline, referred to as the second portion of the received image.

23. The non-transitory computer-readable storage medium of claim 21, further comprising instructions to calculate hypothesis values for each hypothesis of recognition in the generated first series of hypotheses based at least on the determined first coincidence values of a grapheme with a pattern.

24. The non-transitory computer-readable storage medium of claim 23, further comprising instructions to rank the generated first series of hypotheses based on a confidence rating.

25. The non-transitory computer-readable storage medium of claim 21, further comprising instructions to calculate hypothesis values for each hypothesis of recognition in the generated second series of hypotheses based at least on the determined second coincidence values of a grapheme with a pattern.

26. The non-transitory computer-readable storage medium of claim 23, further comprising instructions to select a set of patterns for the second portion of the received image based on the generated first series of hypotheses.

27. The non-transitory computer-readable storage medium of claim 23, further comprising instructions to select a set of patterns for the second portion of the received image based on a knowledge about the sequence of character.

\* \* \* \* \*